(12) United States Patent  
Guo et al.

(10) Patent No.: US 9,342,344 B2
(45) Date of Patent: May 17, 2016

(54) CONTENT-BASED SWAP CANDIDATE SELECTION

(71) Applicant: VMware, Inc., Palo Alto, CA (US)

(72) Inventors: Fei Guo, San Jose, CA (US); Praveen Yedlapalli, State College, PA (US)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 14/254,725

(22) Filed: Apr. 16, 2014

(65) Prior Publication Data

US 2015/0301843 A1    Oct. 22, 2015

(51) Int. Cl.
*G06F 9/455* (2006.01)

(52) U.S. Cl.
CPC .. *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,696,927 A | 12/1997 | MacDonald et al. | |
| 6,516,397 B2 * | 2/2003 | Roy | G06F 12/08 709/247 |
| 6,564,305 B1 * | 5/2003 | Moore | G06F 12/08 358/1.15 |
| 6,681,305 B1 * | 1/2004 | Franke | G06F 12/023 711/170 |
| 7,380,089 B2 * | 5/2008 | Herger | G06F 12/08 711/156 |
| 7,624,240 B1 * | 11/2009 | Colbert | G06F 6/4856 711/159 |
| 7,844,793 B2 * | 11/2010 | Herger | G06F 12/08 711/156 |
| 8,099,568 B2 * | 1/2012 | Colbert | G06F 9/4856 711/159 |
| 8,271,450 B2 * | 9/2012 | Horovitz | G06F 11/301 707/661 |
| 8,275,909 B1 | 9/2012 | Rothstein | |
| 2005/0198460 A1 * | 9/2005 | Herger | G06F 12/08 711/170 |
| 2011/0238943 A1 | 9/2011 | Devendran et al. | |
| 2012/0036325 A1 | 2/2012 | Mashtizadeh et al. | |
| 2013/0031292 A1 | 1/2013 | Van Riel | |
| 2014/0244604 A1 | 8/2014 | Oltean et al. | |
| 2014/0244962 A1 | 8/2014 | Arges et al. | |
| 2014/0281344 A1 | 9/2014 | Shin et al. | |
| 2015/0095919 A1 * | 4/2015 | Vincent | G06F 9/5016 718/104 |
| 2015/0121111 A1 | 4/2015 | Chun et al. | |
| 2015/0135173 A1 * | 5/2015 | Bacher | G06F 9/45558 718/1 |
| 2015/0135175 A1 * | 5/2015 | Bacher | G06F 9/45558 718/1 |
| 2015/0161055 A1 * | 6/2015 | Deguillard | G06F 12/1009 711/6 |
| 2015/0178222 A1 * | 6/2015 | Hopper | G06F 12/121 711/159 |

OTHER PUBLICATIONS

Suchithra et al. "Resource Optimization using Virtual Machine Swapping", 2013 IEEE, pp. 1231-1234.*
Yun et al. "Providing Extra Memory for Virtual Machines by Sharing Compressed Swap Pages", 2014 IEEE, pp. 430-431.*
Molina et al. "Addressing Memory Exhaustion Failures in Virtual Machines in a Cloud Environment", 2013 IEEE, 6 pages.*
LZ4, Extremely Fast Compression Algorithm, https://code.google.com/p/lz4/, viewed Apr. 16, 2014.
LZO, Version 2.06, Aug. 12, 2011, http://www.oberhumer.com/opensource/lzo.

(Continued)

*Primary Examiner* — Van Nguyen (57) ABSTRACT

Techniques for building a list of swap candidate pages for host swapping are provided. In one embodiment, a host system can determine a swap target virtual machine (VM) and a target number of swap candidate pages. The host system can further select a memory page from a memory space of the swap target VM and can check whether the memory page is sharable or compressible. If the memory page is sharable or compressible, the host system can add the memory page to the list of swap candidate pages.

21 Claims, 5 Drawing Sheets

(56) References Cited

OTHER PUBLICATIONS

Snappy, a fast compressor and decompressor, https://code.google.com/p/snappy/, viewed Apr. 16, 2014.
Swingbench, copyright 2010 Dominic Giles, http://www.dominicgiles.com/swingbench.html.
zlib, A Massively Spiffy Yet Delicately Unobtrusive Compression Library, zlib 1.2.8, Apr. 28, 2013, http://www.zlib.net.
B. Agrawal et al., "Vmware view planner: Measuring true virtual desktops experience at scale", VMware Tech Journal, Dec. 2012.

* cited by examiner

CONTENT-BASED SWAP CANDIDATE SELECTION

CROSS REFERENCES TO RELATED APPLICATIONS

The present disclosure is related to commonly assigned U.S. patent application Ser. No. 14/254,696, filed concurrently with the present application, entitled "Page Compressibility Checker." The entire contents of this related application are incorporated herein by reference for all purposes.

BACKGROUND

In the field of computer virtualization, a hypervisor is said to be "memory overcommitted" if the total configured guest memory size of all virtual machines (VMs) running on the hypervisor exceeds the physical memory available to the hypervisor from the underlying physical machine (i.e., host system). Most hypervisors in use today support memory overcommitment, as this allows users to achieve higher VM-to-host consolidation ratios and thereby reduce costs and/or improve operational efficiency.

When a virtualized host runs out of free memory, the hypervisor will attempt to reclaim physical memory from running VMs (in units referred to as "pages" or "memory pages") in order to satisfy new memory allocation requests. The hypervisor can implement a number of different techniques for this purpose, such as page sharing, ballooning, and host swapping. Page sharing is an opportunistic technique that attempts to collapse different memory pages with identical content into a single memory page. This can significantly reduce the memory footprint of VMs that operate on identical code/data. Ballooning relies on a guest balloon driver within the guest operating system of each VM. The guest balloon driver pins guest memory that is not actively used, thereby allowing the hypervisor to free memory pages backing the pinned guest memory and re-allocate the freed pages to other VMs.

Host swapping is a memory reclamation technique that involves swapping out memory pages to a file on disk (known as a "host swap file"). Unlike guest swapping, this process is performed entirely at the hypervisor level, and thus is transparent to VMs. When a VM subsequently attempts to access a swapped-out page, the hypervisor swaps the page back into memory from the host swap file. Unfortunately, this swap-in operation incurs a disk access latency that can be as high as several milliseconds, which is orders of magnitude slower than the typical latency for accessing a shared or ballooned page. As a result, host swapping is generally used as a last resort when the host system's free physical memory falls below a critically low level.

To mitigate the high performance penalty of host swapping, some hypervisors implement optimizations with its host swapping process to prune its list of "swap candidate pages" (i.e., memory pages that have been selected for host swapping) immediately prior to swapping the pages out to disk. For example, according to one implementation, a hypervisor can first attempt to perform page sharing with respect to a swap candidate page. If the sharing operation is successful, the hypervisor can free the swap candidate page so that it can be re-allocated, without performing any host swapping. Since the performance penalty associated with accessing a shared page is significantly smaller than the performance penalty associated with swapping in a page from disk, this optimization can provide a substantial performance boost over pure host swapping.

If the sharing operation is not successful, the hypervisor can further attempt to compress the swap candidate page via a technique known as "memory compression." If the hypervisor determines that the page is compressible via memory compression, the hypervisor can save the compressed page content in a fixed-size block within an in-memory compression cache. The hypervisor can then free the swap candidate page as in the page sharing scenario above, without performing any host swapping. On the other hand, if the page is uncompressible, the hypervisor can swap the page out to disk per its normal host swapping process.

The amount of physical memory that the hypervisor can reclaim with memory compression depends on the difference in size between memory pages and compression cache blocks. For instance, if the memory page size is 4 KB and the compression cache block size is 2 KB, the hypervisor will reclaim 4 KB−2 KB=2 KB of space for each compressed page. Thus, memory compression is not as effective at reclaiming physical memory as host swapping, which can reclaim 4 KB in this scenario for a swapped out page. However, the next time a VM attempts to access a compressed page, the hypervisor only needs to decompress the page and fault it into main memory. The latency for this operation is usually around fifty microseconds, which is almost a hundred times faster than disk swap-in latency. Thus, like page sharing, memory compression can significantly improve performance in low memory scenarios where the only alternative is host swapping.

One limitation with the optimizations described above is that the hypervisor generally does not know whether a given memory page is sharable or compressible until the hypervisor actually attempts to share or compress the page before swapping it out. This prevents the hypervisor from selecting swap candidate pages in a manner that maximizes successful page sharing/compression and minimizes host swapping. For example, according to one common approach, the hypervisor may randomly select swap candidate pages when host swapping is initiated, without any regard to the content of those pages. This may cause the hypervisor to inadvertently select unsharable and/or uncompressible pages as swap candidates, even if there are plenty of sharable or compressible pages to choose from.

SUMMARY

Techniques for building a list of swap candidate pages for host swapping are provided. In one embodiment, a host system can determine a swap target VM and a target number of swap candidate pages. The host system can further select a memory page from a memory space of the swap target VM and can check whether the memory page is sharable or compressible. If the memory page is sharable or compressible, the host system can add the memory page to the list of swap candidate pages.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that can be implemented within a hypervisor to perform "content-based swap candidate selection"—in other words, the selection of memory pages as swap candidates (for host swapping purposes) based on characteristics of the pages' data content. For example, in one embodiment, the hypervisor can select a memory page as a swap candidate if the memory page is "sharable." As used herein, a memory page is sharable if the content of the memory page is identical to one or more other memory pages, and thus can be collapsed into (i.e., merged with) those other pages. Sharability can be determined by, e.g., checking a sharability bit that is included within metadata associated with the page.

In a further embodiment, the hypervisor can select a memory page as a swap candidate if the memory page is "compressible." As used herein, a memory page is compressible if the content of the page can be compressed to an output compression ratio that satisfies a predetermined target compression ratio. For instance, if compression ratio is defined as output (i.e., compressed) size divided by input (i.e., uncompressed) size, the memory page can be deemed compressible if the page's content can be compressed to an output size that achieves a compression ratio less than or equal to the target compression ratio. Alternatively, if compression ratio is defined as input size divided by output size, the memory page can be deemed compressible if the page's content can be compressed to an output size that achieves a compression ratio greater than or equal to the target compression ratio. Compressibility can be determined by, e.g., compressing the memory page using the same compression algorithm used during memory compression, or by invoking an appropriate compressibility checker.

With the content-based selection approach above, the hypervisor can build a list of swap candidate pages that enhances the effectiveness of optimizations implemented within the hypervisor's host swapping process (such as page sharing and memory compression). This, in turn, can reduce the amount of host swapping performed by the host system and thereby improve VM performance in memory overcommitted scenarios.

Figure 1:
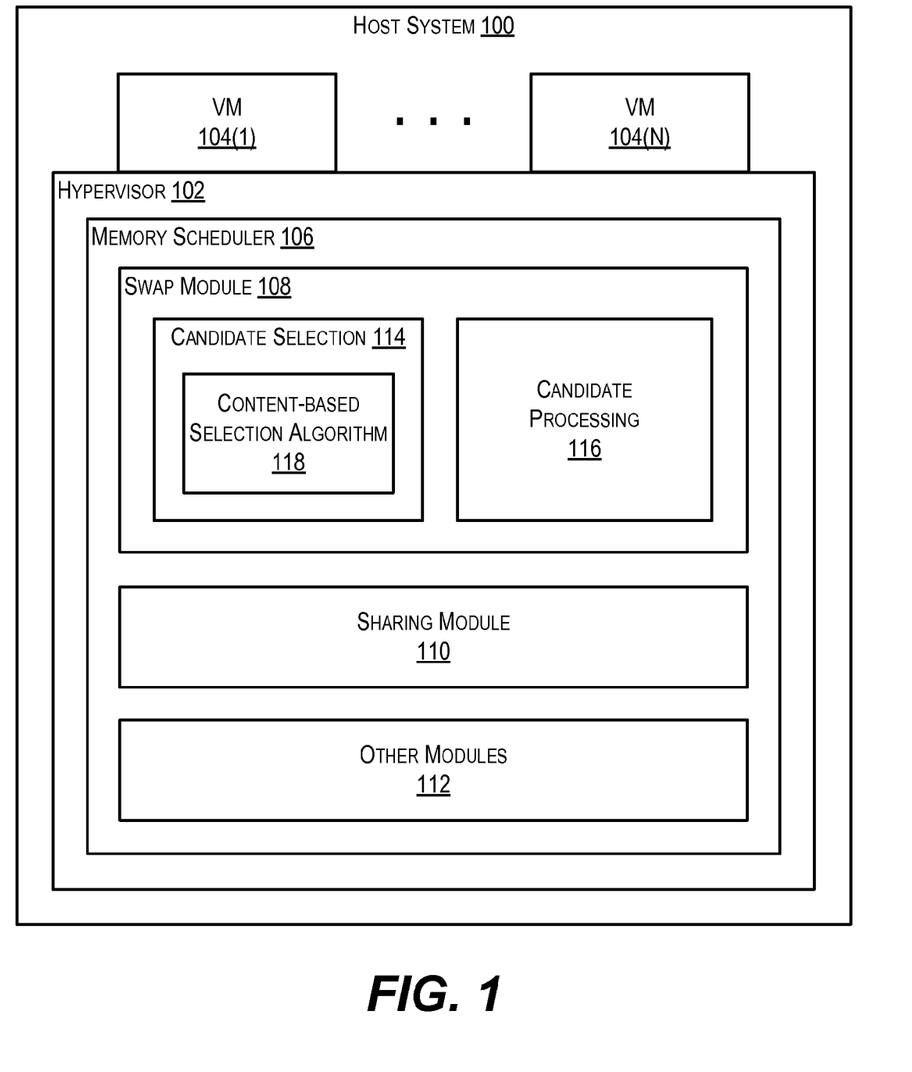
FIG. 1 depicts a host system according to an embodiment.

FIG. 1 depicts a host system 100 that supports content-based swap candidate selection according to an embodiment. As shown, host system 100 executes a virtualization layer (i.e., hypervisor 102) that provides an environment in which one or more VMs 104(1)-104(N) can run. In one embodiment, hypervisor 102 can interact directly with the hardware platform of host system 100 without an intervening host operating system. In this embodiment, hypervisor 102 can include a kernel (not shown) that manages VM use of the various hardware devices of host system 100. In an alternative embodiment, hypervisor 102 can be part of a "hosted" configuration in which hypervisor 102 runs on top of a host operating system (not shown). In this embodiment, hypervisor 102 can rely on the host operating system for physical resource management of hardware devices. One of ordinary skill in the art will recognize various modifications and alternatives for the design and configuration of hypervisor 102.

In the example of FIG. 1, hypervisor 102 includes a memory scheduler 106. Generally speaking, memory scheduler 106 is responsible for managing the allocation of host (i.e., physical) memory to/among VMs 104(1)-104(N), which includes reclaiming memory from the VMs in memory overcommitted scenarios. To that end, memory scheduler 106 comprises a swap module 108 (for performing host swapping), a sharing module 110 (for performing page sharing), and a number of other modules 112 (for performing other memory reclamation techniques, like ballooning, etc.). When hypervisor 102 is memory overcommitted, memory scheduler 106 can use one or more of modules 108, 110, and 112 (either actively or passively) to ensure that host memory is made available to those VMs that actively need it.

For example, in certain embodiments, memory scheduler 106 can invoke sharing module 110 as a passive process. Upon being invoked, sharing module 110 can spawn a scanning thread for each VM 104(1)-104(N) that scans, in the background, the guest memory space of the VM for sharable memory pages (i.e., pages whose content matches one or more other memory pages in the same or different memory space). If the scanning thread finds such a sharable page, the scanning thread can mark a sharability bit (also known as a "cow" bit) in metadata associated with the page (e.g., the page's pframe data structure). Sharing module 110 can then, at regular intervals, collapse memory pages that have been marked with the sharability bit such that a single copy of each unique page remains, and can reclaim the redundant pages for re-use.

In addition, when the amount of free host memory becomes critically low, memory scheduler 106 can invoke swap module 108 to perform host swapping. Upon being invoked, swap module 108 can first build, via a candidate selection component 114, a list of swap candidate pages. This list of swap candidate pages can comprise memory pages that swap module 108 will attempt to swap to disk. Typically, candidate selection component 114 will select the swap candidate pages at random from the memory space of a particular VM (referred to as a "swap target VM") that memory scheduler 106 has selected as being an appropriate target for host swapping. For instance, in one embodiment, memory scheduler 106 can perform "active memory estimation" to estimate the amount of allocated memory that each VM 104(1)-104(N) is actively using. Memory scheduler 106 can then select the VM that is actively using the smallest percentage of its allocated memory as the swap target VM, since that VM will suffer the least performance degradation if a portion of its memory is swapped out.

Once the swap candidate list is built, swap module 108 can process, via a candidate processing component 116, each swap candidate page in the list in order to carry out host swapping. As part of this processing, component 116 can perform certain optimizations to mitigate the high performance penalty associated with host swapping. For example, in one embodiment, candidate processing component 116 can first attempt to perform page sharing within respect to the swap candidate page (i.e., collapse the page into another memory page that has identical content). Note that this sharing attempt is separate from the sharing/scanning performed by sharing module 110, since this sharing attempt is actively initiated by candidate processing component 116 (rather than being performed passively in the background). If the sharing attempt is successful (meaning that the swap candidate page has been successfully collapsed into another page), candidate processing component 116 can free the swap candidate page and remove it from the swap candidate list, without performing any host swapping.

If the sharing attempt is unsuccessful, candidate processing component 116 can apply memory compression—in other words, component 116 can attempt to compress the swap candidate page using a compression algorithm. If the swap candidate page is uncompressible, meaning that the page's output compression ratio does not satisfy a target compression ratio, candidate processing component 116 can swap out the page to disk per the standard host swapping flow. However, if the swap candidate page is compressible, meaning that the page's output compression ratio satisfies the target compression ratio, candidate processing component 116 can save the compressed page data to a block within an in-memory compression cache, without swapping out the page to disk. In this way, candidate processing component 116 can eliminate the disk access latency incurred when swapping the page back into memory at a later point in time.

As noted in the Background section, one inefficiency with the optimizations described above is that the sharability and compressibility of a given memory page is unknown to swap module 108 until candidate processing component 116 attempts to share and compress the page immediately before swapping it out. If swap module 108 had access to page sharability/compressibility information at the time of building the swap candidate list, candidate selection component 114 could preferentially select sharable or compressible memory pages as swap candidates and thereby maximize the number of successful page sharing and compression attempts.

To address the foregoing problem, candidate selection component 114 can implement a novel content-based selection algorithm 118 as shown in FIG. 1. As described in further detail below, content-based selection algorithm 118 can enable candidate selection component 114 to select swap candidates pages based on their content (e.g., whether they are sharable or compressible), which can reduce the amount of host swapping performed by candidate processing component 114 and thus improve overall performance.

It should be appreciated that host system 100 of FIG. 1 is illustrative and not intended to limit the embodiments herein. For example, the various entities depicted in host system 100 may have other capabilities or include other subcomponents that are not specifically described. One of ordinary skill in the art will recognize many variations, modifications, and alternatives.

Figure 2:
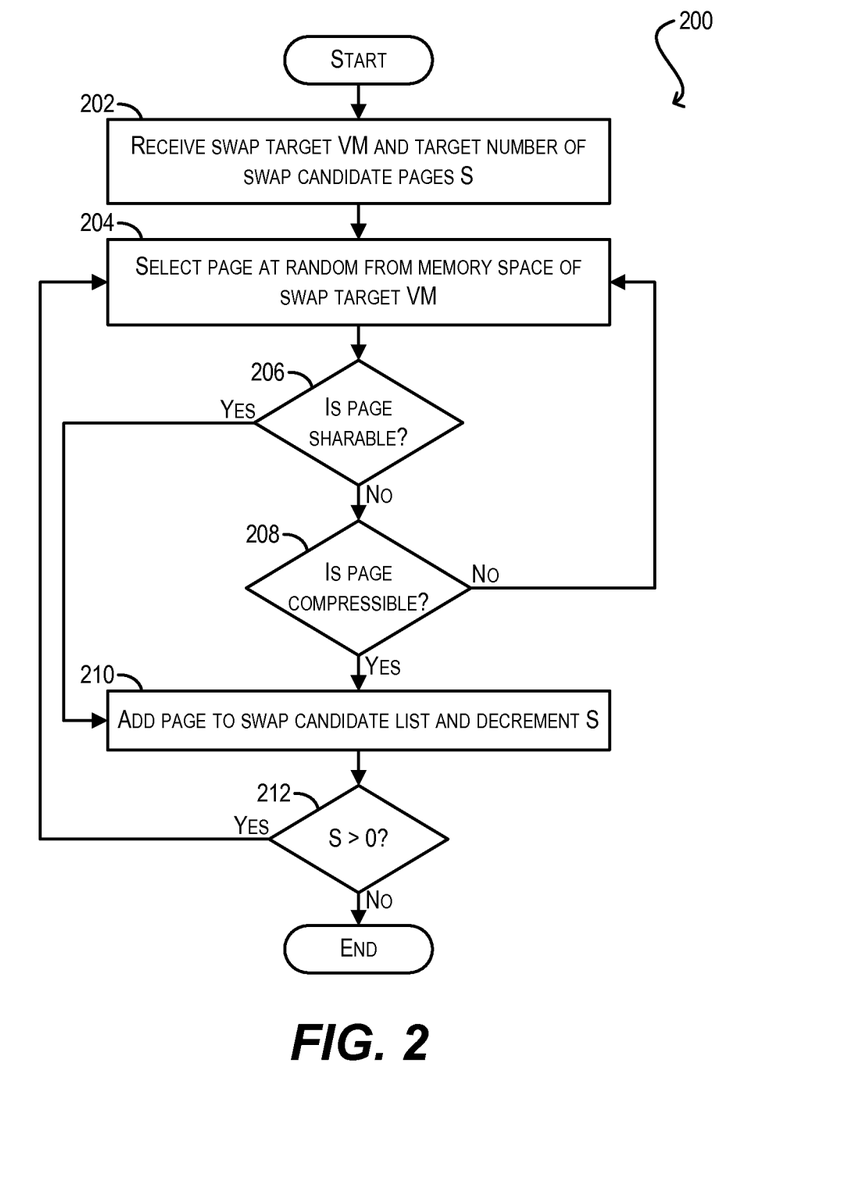
FIG. 2 depicts a flowchart for building a swap candidate list according to an embodiment.

FIG. 2 is a flowchart 200 of a high-level implementation of content-based selection algorithm 118 according to an embodiment. Starting with block 202, candidate selection component 114 can receive the identity of a swap target VM and a target number of swap candidate pages (S) from, e.g., memory scheduler 106. As noted previously, the swap target VM can correspond to the VM that memory scheduler 106 has determined will face the least performance impact from host swapping.

At block 204, candidate selection component 114 can randomly select a memory page from the allocated memory range of the swap target VM. Candidate selection component 114 can then check whether the selected memory page is sharable (i.e., can be collapsed into another existing page) (block 206). In certain embodiments, candidate selection component 114 can perform this check by accessing the sharability bit (i.e., cow bit) within the metadata of the memory page. As discussed with respect to FIG. 1, this sharability bit can be updated by a background scanning thread of sharing module 110. If the sharability bit is set (i.e., equals 1), candidate selection component 114 can conclude that the page is sharable. If the sharability bit is not set (i.e., equals 0), candidate selection component 114 can conclude that the page is not sharable.

If candidate selection component 114 determines that the memory page is sharable at block 206, component 114 can add the page to the swap candidate list and decrement the value of S (block 210). Candidate selection component 114 can then check whether S is greater than zero (i.e., whether the target number of swap candidate pages has been reached) (block 212). If so, flowchart 200 can end. Otherwise, candidate selection component 114 can return to block 204 in order to select and process additional potential swap candidates.

On the other hand, if candidate selection component 114 determines that the memory page is not sharable at block 206, component 114 can check whether the page is compressible (i.e., can be compressed to an output compression ratio that satisfies a target compression ratio) (block 208). In one embodiment, this check can be performed by compressing the memory page using the same compression algorithm that is used by candidate processing component 116 for memory compression. In an alternative embodiment, this check can be performed by invoking an appropriate compressibility checker. An example of an high-performance compressibility checker that can be used for this purpose is described in co-pending U.S. application Ser. No. 14/254,696, entitled "PAGE COMPRESSIBILITY CHECKER."

If candidate selection component 114 determines that the memory page is compressible at block 208, component 114 can add the page to the swap candidate list and decrement the value of S (block 210). Candidate selection component 114 can then check whether S is greater than zero (block 212) and if so, flowchart 200 can end. Otherwise, candidate selection component 114 can return to block 204 in order to select and process additional potential swap candidates.

Finally, if candidate selection component 114 determines that the memory page is not compressible at block 208, component 114 can return directly to block 204.

One potential issue with the implementation of algorithm 118 shown in FIG. 2 is that there is no limit on the number of memory pages that candidate selection component 114 may need to evaluate before completely filling the swap candidate list. This may cause candidate selection component 114 to check the sharability and compressibility of an excessively large number of memory pages in order to reach target swap candidate number S, which may degrade the performance of host system 100. Further, there may be scenarios where there simply are not enough sharable or compressible pages in the memory space of the swap target VM to completely fill the list.

Figure 3A:
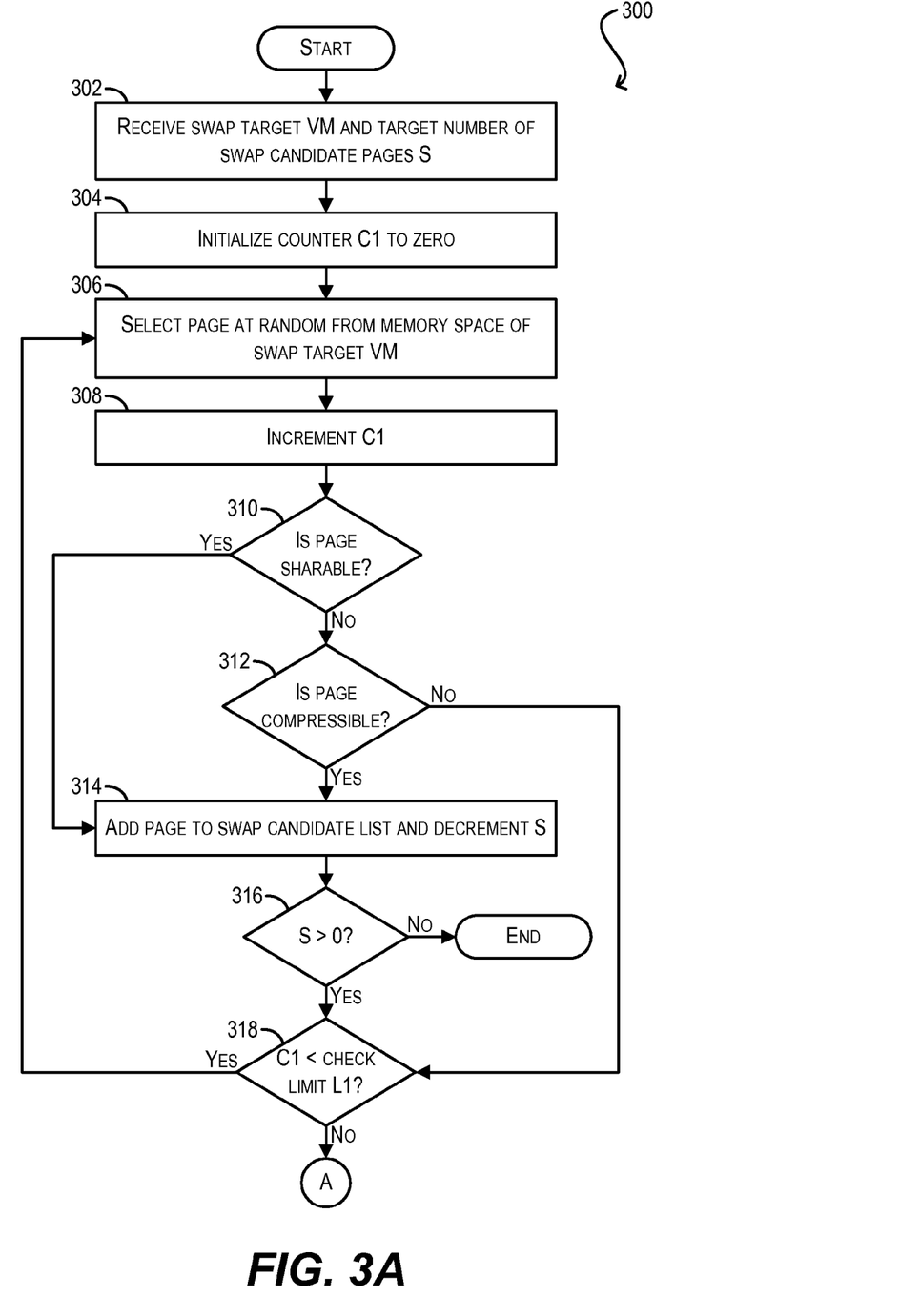
FIGS. 3A and 3B depict another flowchart for building a swap candidate list according to an embodiment.
Figure 3B:
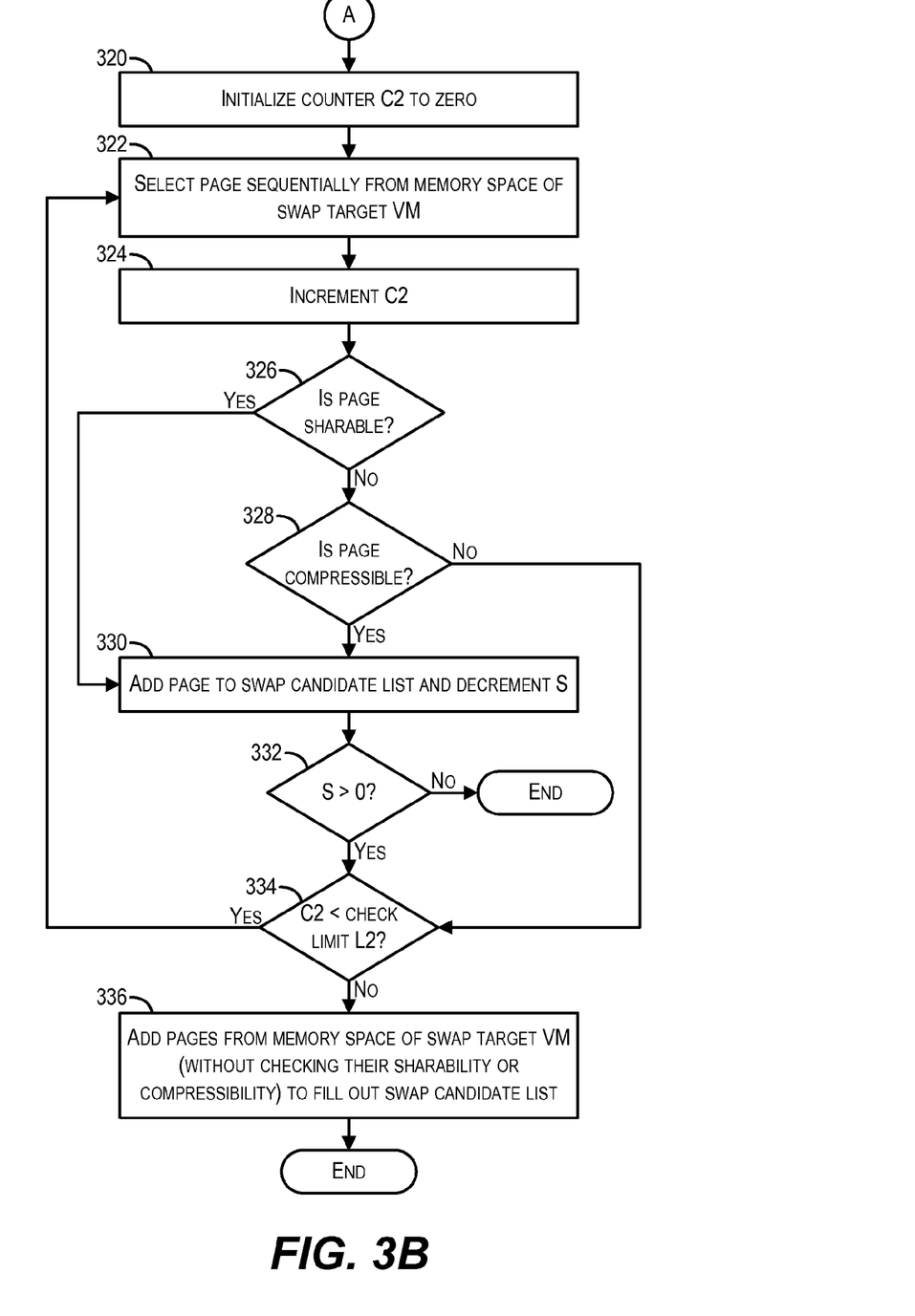

To address this, FIGS. 3A and 3B depict a flowchart 300 of an alternative implementation of content-based selection algorithm 118 according to an embodiment. As described below, flowchart 300 comprises two phases: a first phase in which candidate selection component 114 randomly searches for sharable and/or compressible pages in the memory space of the swap target VM up to a first limit value, or "check limit," L1; and a second phase in which candidate selection component 114 sequentially searches for sharable and/or compressible pages in the memory space of the swap target VM up to a second limit value, or check limit, L2. If the swap candidate list is still not full (i.e., target number S is not reached) after the first and second phases, candidate selection component can fill out the rest of the list using non-sharable and/or uncompressible memory pages. In this way, flowchart 300 can guarantee that the selection algorithm will complete within a bounded period of time.

Starting with FIG. 3A, candidate selection component 114 can first receive the identity of a swap target VM and a target number of swap candidate pages (S) from, e.g., memory scheduler 106 (block 302). This step is substantially similar to block 202 of FIG. 2. Once the swap target VM and target number S are received, candidate selection component 114 can initialize a counter C1 to zero, select a memory page at random from the memory space of the swap target VM, and increment the value of C1 (blocks 304, 306, 308).

At block 310, candidate selection component 114 can check whether the selected memory page is sharable. If the page is sharable, candidate selection component 114 can add the page to the swap candidate list, decrement the value of S, and if S is equal to zero, terminate flowchart 300 (blocks 314 and 316).

If candidate selection component 114 determines that the memory page is not sharable at block 310, component 114 can move on to checking whether the page is compressible (block 312). If the page is compressible, candidate selection component 114 can similarly add the page to the swap candidate list, decrement the value of S, and if S is equal to zero, terminate flowchart 300 (blocks 314 and 316).

However, if candidate selection component 114 determines that either (1) the memory page is uncompressible at block 312, or (2) S is greater than zero at block 316 (indicating that the swap candidate list is not yet full), component 114 can determine whether counter C1 is less than check limit L1 (block 318). As noted above, check limit L1 is a value that caps the number of memory pages that candidate selection component 114 can randomly select and evaluate for sharability/compressibility. Thus, L1 effectively bounds the amount of time that candidate selection component 114 may spend on blocks 306-316 (i.e., the first phase) of flowchart 300. In a particular embodiment, L1 can be a multiple of target swap candidate number S, such as 3×S.

If C1 is less than L1 at block 318, candidate selection component 114 can return to block 306 in order to select and process additional memory pages at random from the memory space of the swap target VM.

On the other hand, if C1 is greater than (or equal to) L1 at block 318, candidate selection component 114 can proceed to the second phase of the candidate selection process (as shown in FIG. 3B).

Starting with blocks 320, 322, and 324 of FIG. 3B, candidate selection component 114 can initialize a second counter C2 to zero, select a memory page sequentially (rather than randomly) from the memory space of the swap target VM, and can increment the value of C2.

At block 326, candidate selection component 114 can check whether the selected memory page is sharable. If the page is sharable, candidate selection component 114 can add the page to the swap candidate list, decrement the value of S, and if S is equal to zero, terminate flowchart 300 (blocks 330 and 332).

If candidate selection component 114 determines that the memory page is not sharable at block 326, component 114 can move on to checking whether the page is compressible (block 328). If the page is compressible, candidate selection component 114 can similarly add the page to the swap candidate list, decrement the value of S, and if S is equal to zero, terminate flowchart 300 (blocks 330 and 332).

However, if candidate selection component 114 determines that either (1) the memory page is uncompressible at block 328, or (2) S is greater than zero at block 332 (indicating that the swap candidate list is not yet full), component 114 can determine whether counter C2 is less than check limit L2 (block 334). As noted above, check limit L2 is a value that caps the number of memory pages that candidate selection component 114 can sequentially select and evaluate for sharability/compressibility. Thus, L2 effectively bounds the amount of time that candidate selection component 114 may spend on blocks 322-332 (i.e., the second phase) of flowchart 300. In a particular embodiment, L2 can be a multiple of target swap candidate number S minus the number of swap candidate pages added during the first phase of flowchart 300 (F), such as 5×(S−F).

If C2 is less than L2 at block 334, candidate selection component 114 can return to block 322 in order to select and process additional memory pages sequentially from the memory space of the swap target VM.

On the other hand, if C2 is greater than (or equal to) L2 at block 334 (indicating that the check limit for the second phase has been reached), candidate selection component 114 can, as a last resort, fill out the swap candidate list with additional memory pages from the memory space of the swap target VM, without checking their sharability or compressibility (block 336). In this situation, the swap candidate list may include some pages that are not sharable or compressible. Nevertheless, this potential inefficiency is deemed acceptable in view of the additional time/effort that would be needed to find further sharable or compressible pages (beyond check limits L1 and L2).

Figure 4:
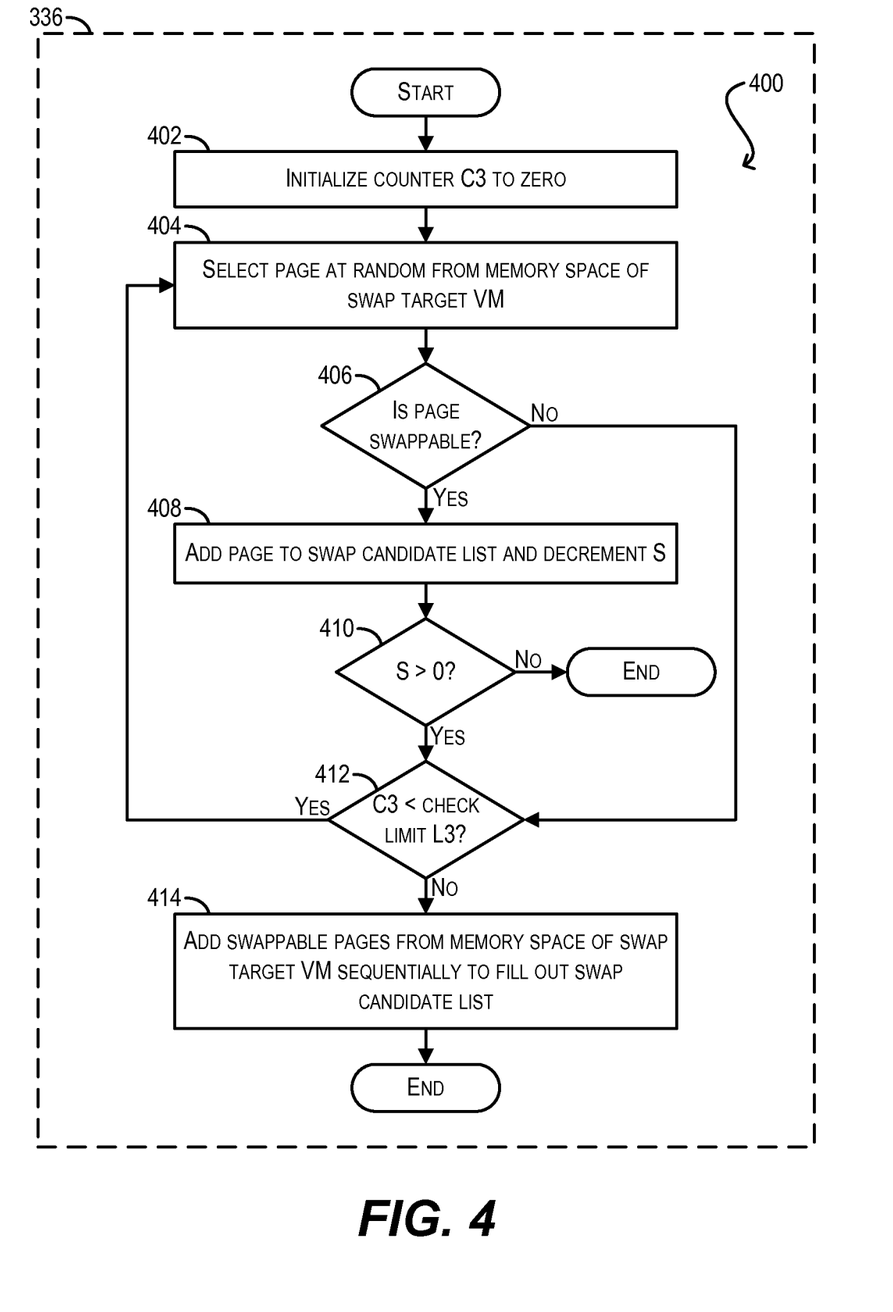
FIG. 4 depicts a flowchart for filling out a swap candidate list according to an embodiment.

It should be noted that there are different ways in which the "filling" process of block 336 of flowchart 300 can be implemented. FIG. 4 depicts a flowchart 400 of one exemplary implementation according to an embodiment. Starting with blocks 402 and 404, candidate selection component 114 can initialize a third counter C3 to zero and can select a memory page at random from the memory space of the swap target VM.

Candidate selection component 114 can then verify whether the selected memory page is "swappable" (block 406). In various embodiments, certain types of memory pages, such as pinned pages, compressed pages, or unmapped pages are deemed unswappable for host swapping purposes. Thus, the processing at block 406 can check whether the selected page falls into any of these categories.

If candidate selection component 114 determines that the memory page is swappable at block 406, component 114 can add the page to the swap candidate list, decrement the value of S, and if S is equal to zero, terminate flowchart 400 (blocks 408 and 410).

However, if candidate selection component 114 determines that either (1) the memory page is unswappable at block 406, or (2) S is greater than zero at block 410 (indicating that the swap candidate list is not yet full), component 114 can determine whether counter C3 is less than a check limit L3 (block 412). Check limit L3 is a value that caps the number of memory pages that candidate selection component 114 can randomly select and evaluate in the context of blocks 404-410. Thus, L3 effectively bounds the amount of time that candidate selection component 114 may spend on these processing steps. In a particular embodiment, L3 can be a multiple of target swap candidate number S, such as 3×S.

If C3 is less than L3 at block 412, candidate selection component 114 can return to block 404 in order to select and process additional memory pages at random from the memory space of the swap target VM.

On the other hand, if C3 is greater than (or equal to) L3 at block 412, candidate selection component 114 can fill out the remainder of the swap candidate list by adding swappable memory pages that are selected sequentially from the memory space of the swap target VM (block 414). Flowchart 400 can then end.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for building a list of swap candidate pages for host swapping, the method comprising:
   determining, by a host system, a swap target virtual machine (VM) and a target number of swap candidate pages, wherein the swap target VM is a VM running on the host system that a hypervisor of the host system has determined to be a target for host swapping, and wherein the swap candidate pages are memory pages in a memory space of the swap target VM that the hypervisor will attempt to swap to disk when host swapping is initiated;
   selecting, by the host system, a memory page from the memory space of the swap target VM;
   checking, by the host system, whether the memory page is sharable or compressible; and
   adding, by the host system, the memory page to the list of swap candidate pages if the memory page is sharable or compressible.

2. The method of claim 1 wherein the memory page is sharable if a sharability bit is set within a metadata portion of the memory page.

3. The method of claim 1 wherein the memory page is compressible if the memory page can be compressed to an output compression ratio that satisfies a predetermined target compression ratio.

4. The method of claim 1 wherein the memory page is selected at random from the memory space of the swap target VM, and wherein the selecting, the checking and the adding are repeated until:
   a number of memory pages added to the list of swap candidate pages reaches the target number; or
   a number of memory pages selected at random from the memory space of the swap target VM reaches a first limit value.

5. The method of claim 4 wherein the first limit value is a multiple of the target number.

6. The method of claim 5 wherein, if the number of memory pages selected at sequentially from the memory space of the swap target VM reaches the second limit value before the number of memory pages added to the list of swap candidate pages reaches the target number, the method further comprises:

adding additional memory pages from the memory space of the swap target VM to the list of swap candidate pages, without checking whether the additional memory pages are sharable or compressible, until the number of memory pages added to the list of swap candidate pages reaches the target number.

7. The method of claim 4 wherein, if the number of memory pages selected at random from the memory space of the swap target VM reaches the first limit value before the number of memory pages added to the list of swap candidate pages reaches the target number, the method further comprises:

selecting a memory page sequentially from the memory space of the swap target VM;

checking whether the memory page is sharable or compressible; and adding the memory page to the list of swap candidate pages if the memory page is sharable or compressible, wherein the selecting, the checking, and the adding are repeated until:
the number of memory pages added to the list of swap candidate pages reaches the target number; or
a number of memory pages selected sequentially from the memory space of the swap target VM reaches a second limit value.

8. A non-transitory computer readable storage medium having stored thereon software executable by a host system, the software embodying a method for building a list of swap candidate pages for host swapping, the method comprising:

determining a swap target VM and a target number of swap candidate pages, wherein the swap target VM is a VM running on the host system that a hypervisor of the host system has determined to be a target for host swapping, and wherein the swap candidate pages are memory pages in a memory space of the swap target VM that the hypervisor will attempt to swap to disk when host swapping is initiated;

selecting a memory page from the memory space of the swap target VM;

checking whether the memory page is sharable or compressible; and adding the memory page to the list of swap candidate pages if the memory page is sharable or compressible.

9. The non-transitory computer readable storage medium of claim 8 wherein the memory page is sharable if a sharability bit is set within a metadata portion of the memory page.

10. The non-transitory computer readable storage medium of claim 8 wherein the memory page is compressible if the memory page can be compressed to an output compression ratio that satisfies a predetermined target compression ratio.

11. The non-transitory computer readable storage medium of claim 8 wherein the memory page is selected at random from the memory space of the swap target VM, and wherein the selecting, the checking and the adding are repeated until:
a number of memory pages added to the list of swap candidate pages reaches the target number; or
a number of memory pages selected at random from the memory space of the swap target VM reaches a first limit value.

12. The non-transitory computer readable storage medium of claim 11 wherein the first limit value is a multiple of the target number.

13. The non-transitory computer readable storage medium of claim 11 wherein, if the number of memory pages selected at random from the memory space of the swap target VM reaches the first limit value before the number of memory pages added to the list of swap candidate pages reaches the target number, the method further comprises:

selecting a memory page sequentially from the memory space of the swap target VM;

checking whether the memory page is sharable or compressible; and adding the memory page to the list of swap candidate pages if the memory page is sharable or compressible, wherein the selecting, the checking, and the adding are repeated until:
the number of memory pages added to the list of swap candidate pages reaches the target number; or
a number of memory pages selected sequentially from the memory space of the swap target VM reaches a second limit value.

14. The non-transitory computer readable storage medium of claim 13 wherein, if the number of memory pages selected at sequentially from the memory space of the swap target VM reaches the second limit value before the number of memory pages added to the list of swap candidate pages reaches the target number, the method further comprises:

adding additional memory pages from the memory space of the swap target VM to the list of swap candidate pages, without checking whether the additional memory pages are sharable or compressible, until the number of memory pages added to the list of swap candidate pages reaches the target number.

15. A computer system comprising:
a processor; and
a non-transitory computer readable medium having stored thereon program code that causes the processor to, upon being executed:
determine a swap target VM and a target number of swap candidate pages, wherein the swap target VM is a VM running on the host system that a hypervisor of the host system has determined to be a target for host swapping, and wherein the swap candidate pages are memory pages in a memory space of the swap target VM that the hypervisor will attempt to swap to disk when host swapping is initiated;
select a memory page from the memory space of the swap target VM;
check whether the memory page is sharable or compressible; and
add the memory page to a list of swap candidate pages if the memory page is sharable or compressible.

16. The computer system of claim 15 wherein the memory page is sharable if a sharability bit is set within a metadata portion of the memory page.

17. The computer system of claim 15 wherein the memory page is compressible if the memory page can be compressed to an output compression ratio that satisfies a predetermined target compression ratio.

18. The computer system of claim 15 wherein the memory page is selected at random from the memory space of the swap target VM, and wherein the selecting, the checking and the adding are repeated until:
a number of memory pages added to the list of swap candidate pages reaches the target number; or
a number of memory pages selected at random from the memory space of the swap target VM reaches a first limit value.

19. The computer system of claim 18 wherein the first limit value is a multiple of the target number.

20. The computer system of claim 18 wherein, if the number of memory pages selected at random from the memory space of the swap target VM reaches the first limit value before the number of memory pages added to the list of swap candidate pages reaches the target number, the program code further causes the processor to:
   select a memory page sequentially from the memory space of the swap target VM;
   check whether the memory page is sharable or compressible; and
   add the memory page to the list of swap candidate pages if the memory page is sharable or compressible,
   wherein the selecting, the checking, and the adding are repeated until:
     the number of memory pages added to the list of swap candidate pages reaches the target number; or
     a number of memory pages selected sequentially from the memory space of the swap target VM reaches a second limit value.

21. The computer system of claim 20 wherein, if the number of memory pages selected at sequentially from the memory space of the swap target VM reaches the second limit value before the number of memory pages added to the list of swap candidate pages reaches the target number, the program code further causes the processor to:
   add additional memory pages from the memory space of the swap target VM to the list of swap candidate pages, without checking whether the additional memory pages are sharable or compressible, until the number of memory pages added to the list of swap candidate pages reaches the target number.

\* \* \* \* \*